(12) United States Patent
Bigolin

(10) Patent No.: US 8,119,968 B2
(45) Date of Patent: Feb. 21, 2012

(54) MULTIFUNCTIONAL REAR VIEW MIRROR MOUNTED DEVICE FOR BICYCLES WHICH PROVIDES DISPLAY INFORMATION

(75) Inventor: Riccardo Bigolin, Casella d'Asolo (IT)

(73) Assignee: Selle Italia S.R.L., Casella d'Asolo (Treviso) (IT)

( * ) Notice: Subject to any disclaimer, the term of this patent is extended or adjusted under 35 U.S.C. 154(b) by 298 days.

(21) Appl. No.: 12/455,228

(22) Filed: May 29, 2009

(65) Prior Publication Data

US 2009/0316285 A1     Dec. 24, 2009

(30) Foreign Application Priority Data

Jun. 6, 2008   (IT) .............................. MI2008A1038

(51) Int. Cl.
     *H01L 27/00*     (2006.01)

(52) U.S. Cl. ...................................... 250/208.1; 250/239
(58) Field of Classification Search ............... 250/208.1, 250/239, 214 R; 359/879, 604, 872; 340/425.5, 340/438, 461, 815.4–815.45
See application file for complete search history.

(56) References Cited

U.S. PATENT DOCUMENTS 5,016,996 A * 5/1991 Ueno ............................ 359/838
5,631,638 A * 5/1997 Kaspar et al. ................. 340/902

* cited by examiner

*Primary Examiner* — Que T Le
(74) *Attorney, Agent, or Firm* — Hedman & Costigan, P.C.; Kathleen A. Costigan

(57) ABSTRACT

A multifunctional safety, information and comfort device to be mounted on a vehicle, preferably a bicycle, comprises a rear-view mirror, an alphanumeric and iconographic display, sensors for measuring kinetic and environmental parameters, electronic components for measuring time and controlling said device, and an independent power supply.

11 Claims, 3 Drawing Sheets

A road inclined at an angle $\vartheta$ and with a cyclist acceleration ($a$)

$\alpha_x = -g \cdot sen(\vartheta + \vartheta_0) - a \cdot sen(\vartheta_0)$
$\alpha_y = -g \cdot cos(\vartheta + \vartheta_0) - a \cdot cos(\vartheta_0)$

MULTIFUNCTIONAL REAR VIEW MIRROR MOUNTED DEVICE FOR BICYCLES WHICH PROVIDES DISPLAY INFORMATION

BACKGROUND OF THE INVENTION

The present invention relates to a multifunctional device for vehicles.

It is well known that rear-view mirrors represent very useful devices allowing visibility of vehicle traffic on the rear of a road user and, for vehicles, such as cars and motorcycles, the use of rear-view mirrors is absolutely indispensable.

For example, cars conventionally comprise at least three rear-view mirrors, that is a central and two side rear-view mirrors, which must be compulsory installed for meeting law requirements.

Likewise, in a motorcycle it is necessary, for meeting the same law requirements, to mount two rear-view mirrors on the side of the motorcycle handlebar.

On the other hand, is not compulsory to mount rear-view mirrors on bicycles, since a bicycle is considered a low speed vehicle affording the bicycle user comparatively high movement freedom degrees, and an easy visibility even at the user back.

On the contrary, notwithstanding the above, a cyclist operates in an operating condition subjected to possible impacts from other transport means or vehicles, with consequent possible serious dangers, since said other vehicles are usually driven on the same road with a speed and pushiness much greater than that of a bicycle.

Thus, even a slight accident to a cyclist would be very serious because of the above lacking of any physical protection on the bicycle.

Thus, for solving the above problem, also a bicycle should comprise at least a rear-view mirror, and such a provision should be made compulsory by the road traffic law.

However, at present, prior rear-view mirrors are unsuitable to improve use safety and comfort in modern transport means and, in particular, in a bicycle.

SUMMARY OF THE INVENTION

Accordingly, the aim of the present invention is to provide such a rear-view mirror which, in addition to a conventional rear view function proper, also provides several other useful functions for cyclists and other road users.

Within the scope of the above mentioned aim, a main object of the invention is to provide such a rear-view mirror which comprises specifically designed built-in functional components, allowing it to also operate as a smart information store and dispenser for storing and delivering information useful for driving a bicycle, or transport means, while preserving the vehicle user performance unaltered, and without hindering and distracting the user.

Another object of the present invention is to provide such a rear-view mirror which can be advantageously used also in cars, motorcycles and so on, so as to provide an auxiliary device for improving the operation of other conventional on-board user devices.

Yet another object of the invention is to provide such a rear-view mirror which, owing to its specifically designed constructional features, is very reliable and safe in operation.

Yet another object of the present invention is to provide such a rear-view mirror construction, which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a multifunctional device for vehicles, characterized in that said multifunctional device comprises an information and data display, built-in in a rear-view mirror.

In particular, the device according to the present invention can be installed on a bicycle, and comprises, as main components thereof, a rear-view mirror, an alphanumeric and iconographic display, measuring sensors for measuring kinetic and environmental parameters, time electronic measuring components for managing the overall device, and an independent power supply assembly, said device being so designed as to provide several support functions related to a user safety, information and comfort in an on-road use of the vehicle.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative example, in the accompanying drawings, where.

DESCRIPTION OF THE PREFERRED EMBODIMENTS

Figure 1:
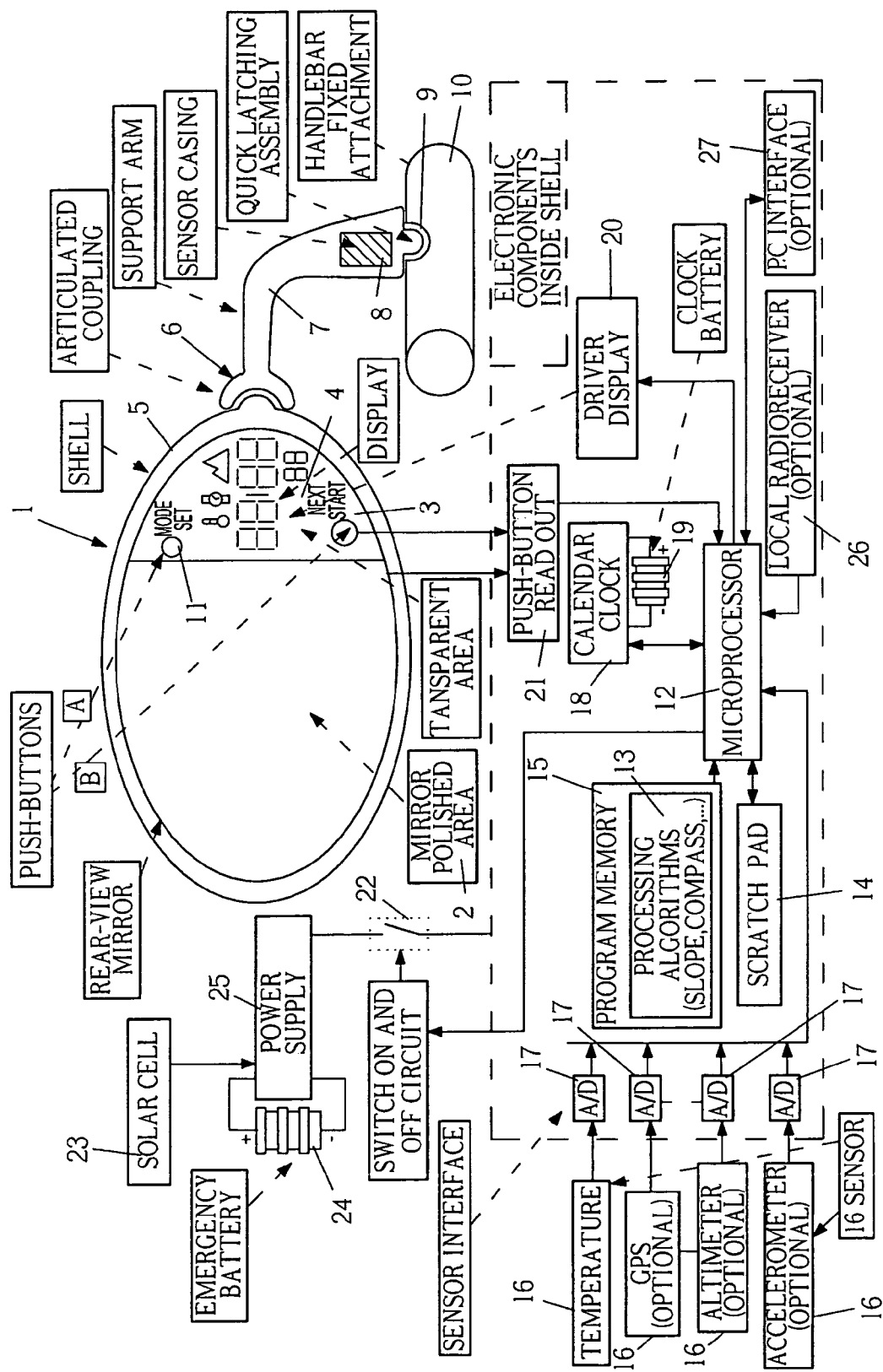
FIG. 1 is a block diagram showing a preferred embodiment of the rear-view mirror according to the present invention.

With reference to the number references of the block diagram shown in FIG. 1, the main element of the inventive device is a smart rear-view mirror 1, said rear-view mirror having a polished mirror surface defining two mirror surface parts, the first of which, that is the mirror area proper 2, has reflecting properties, like a conventional mirror, whereas the second part, that is the area 3, is clear or transpired like a conventional glass material.

More specifically, the mirror area 2 provides a rear-view mirror function proper, the transparent area 3 having such a size as to not hinder the operation of the part 2, and allowing to also see elements arranged on the rear of the glass surface.

More specifically, a display assembly 4 is so designed as to properly display different numerical parameters which will be disclosed in a more detailed manner hereinafter.

The mirror 1 is engaged in a dedicated mirror shell 5, which operates for clamping and supporting the mirror 1, while protecting and supporting electronic devices and sensors, which will be disclosed hereinafter, controlling the operation of the device.

Said shell 5 is made of a technologically improved material, such as a carbon fiber material, to provide the subject device with a have very high strength and lightness, which would be very useful for a cyclist.

The front part of said shell 5 provides a sealed relationship on the shell edge, to prevent moisture for entering this intelligent or smart mirror, in a rain condition.

Said mirror shell 5 is moreover coupled to a supporting arm 7, through an articulated coupling assembly 6, allowing to properly orient the subject smart mirror according to the user requirements and preferences.

Said articulated coupling assembly 6 allows a small electric cable to pass therethrough, to be fed to optional sensors housed in the supporting arm 7, for allowing the mirror sensor assembly to be mounted at a fixed position with respect to the bicycle framework, even if the bicycle user would change at will the position of the mirror through the articulated coupling assembly 6, and further facilitating in locating an acceleration sensor inside the swinging shell 5 even if the bicycle running direction and inclination with respect to the road are not precisely known.

Thus, such a possibility of installing sensors or electronic devices in the supporting arm 7 is very advantageous and constitutes a main feature of the invention, as it will become more apparent hereinafter.

As shown, the supporting arm 7 comprises moreover a quick clamping assembly 9, allowing the supporting arm to be easily and quickly engaged with and disengaged from the handlebar 10 attachment assembly, clamping the device to the bicycle handlebar, thereby allowing a user to easily and quickly remove the rear-view mirror from the bicycle, for shipment or transport purposes, or for preventing the rear-view mirror from being removed by thieves or vandals.

In particular, in said shell 5 the most part of the electronic and sensor components for managing the overall device and providing the user with the information required are housed.

In the block diagram of FIG. 1, the electronic components are is shown encompassed by a dashed line, whereas the sensors 16 and display 4 are shown outside of this dashed line, the display 4, in the preferred embodiment herein disclosed, being adapted to display numeric digits, icons and preset alphanumeric words, and having such a size as to be easily seen and read-out, even by persons with slight visual defects, such as shortsighted or farsighted persons, without the need of wearing eyeglasses or other vision improving means, said display 4 being advantageously of a so-called LCD type, based on the reflecting liquid crystal display technology, so as said display can be clearly seen under daylight and without back illuminating auxiliary means.

It should be apparent that in further embodiments of the inventive smart rear-view mirror other display means based on a different technology and with different displaying features, depending on the on-board sensors, could also be used.

The inventive smart rear-view mirror comprises moreover a number of push-buttons 11 for controlling operating preset, drive operations and the display modes of operation.

In the preferred embodiment, the inventive smart rear-view mirror comprises two push-buttons 11a and 11b with variable functions depending on requirements, and on the information words to be displayed on said display 4, the push-buttons 11a and 11b arranged on the front of the device, on the surface of said display assembly 4 or near said surface, thereby allowing the user to press them while simultaneously seeing the information displayed on the display assembly 4.

A preferred constructional technology is the so-called "touch screen" technology, in which the pushbuttons are actuated by simply touching the pushbutton surface, due a capacitive effect, without any mechanical movements of components.

However, it would be also possible to use other functionally equivalent embodiments of said push-buttons, for example of a membrane or mechanical type, while holding the operating characteristics of the display 4 assembly surface unaltered.

The display assembly 4 and pushbuttons 11, 11a and other on-board sensor components, are controlled by a microprocessor 12 including a dedicated program memory 13, a scratchpad 14 and a program with a number of processing algorithms 15 adapted to transform raw data from the on-board sensors 16 into digital data representing user interesting information, said on-board sensors 16 being precisely interfaced through suitable sensor interfaces 17, in general with a different interface for each different sensor.

Said microprocessor 12, moreover, will also receive data related to hour and date time from a clock/calendar 18 including a dedicated clock battery 19 for continuously operating.

Furthermore, said microprocessor 12 drives, either directly or through a dedicated display driver 20, said display assembly 4 and reads out the status of the pushbuttons 11a, 11b through a push-button reading interface 21, to properly control or manage all the user requirements, and the switching on and off circuit 22 which, in the preferred embodiment herein disclosed, is coupled to a solar cell 23 supplying electric power to all the on-board electronic components, as it is sufficiently illuminated either by a solar or an artificial light, thereby the rear-view mirror to operate in a nearly or unlimited manner without the need of changing or periodically charging batteries, with the sole limitation that said rear-view mirror could not be used under insufficient illuminating conditions, which situation, on the other hand, would be rather exceptional and generally evaded by professional sport cyclists.

Optionally, moreover, said solar cell 23 could be backed-up by an emergency battery 24, to be actuated under an insufficient solar light or if imposed by a particular condition of the subject smart rear-view mirror.

In the preferred embodiment herein disclosed, said smart rear-view mirror will operate only in the presence of daylight which, moreover, would be also necessary for properly seeing the display LCD4 assembly, since, as stated, in a preferred embodiment thereof, it is of a reflecting type.

The power supply circuit 25, in turn, will provide electric power to the electronic component, as controlled by the microprocessor 12.

In the preferred embodiment herein disclosed, the information available for a user on said display assembly 4, to be selected by operating the above push-buttons 11a, 11b will be as follows:
  a) clock,
  b) calendar,
  c) chronometer,
  d) air temperature,
  e) road slope or inclination (of instantaneous and average values), which possibility of measuring the road inclination, is a main feature of the present invention.

Said road inclination, according to the invention, is measured by measuring the gravity force in a direction perpendicular to the horizontal axis of the bicycle and, accordingly, represents a direct and instantaneous measurement of the bicycle inclination, which is performed without the need of calculating, as in the prior art, a ratio between a level difference measured by an altimeter and the bicycle covered distance, to be measured by an odometer, which method frequently provides a wrong average slope value.

Such an inventive measuring method will be disclosed in larger details hereinafter.

The parameters which can be displayed could pertain to a very broad range, to be limited only by the display type, the sensor arrangements mounted on the subject smart rear-view mirror, and the device cost.

The functional inventive improvement could be also performed by adding further optional elements and/or by replacing some other components.

By way of a non limitative example of the above parameters further improvements are hereinbelow shown:

f) the bicycle covered distance,
g) the bicycle speed,
h) the bicycle altitude,
i) the direction of the covered path (the so-called compass function),
j) the location or position on a local map.

Each of the above mentioned functions will obviously require a dedicated on-board sensor.

In particular, the compass function may be carried out by including a GPS receiver, and would represent a minimum datum to be achieved by this technology and being compatible with the display LCD assembly 4.

In a further improved embodiment of the subject rear-view mirror, including a display of larger size and resolution, it is also possible to include therein location maps of the region therethrough a user intends to perform cyclistic trips.

This function, which constitutes a further important aspect of the present invention and which will be disclosed in a more detailed manner hereinafter, would be greatly appreciated by and interesting for cyclo-cross and mountain bike fans.

Said maps, in particular, can be constructed by using an optional PC coupling interface (the PC interface 27 shown in the herein enclosed block diagram), which could also be used for other applications.

Another interesting optional provision is to include in the inventive mirror a local radioreceiver 26, to receive information from other sensors arranged at convenient positions on the bicycle.

Thus, owing to the provision of the local radioreceiver 26, the above functional improvement can be achieved without the need of including in the bicycle further electric wirings, very difficult to be made on existing bicycles not designed for fitting the above wiring operations.

Among useful data to be displayed on the display assembly 4, upon processing the information received from the local radioreceiver 26, are to be mentioned the user heart rate, as measured by a dedicated heart rate sensor applied on the user trunk or on manual contacts or electrodes mounted on the bicycle handlebar and the user blood flow or pressure.

Said local radioreceiver 26, in particular is so designed as to meet market standard requirements, such as a very small range capability.

Moreover in a near future it would be also possible to use advanced technologies or methods (such as the Bluetooth or Zig Bee technology) allowing to exchange data with a computer or other highly integrated devices (such as hand held smart devices, cellular phones and the like).

Thus, the rear-view mirror according to the present invention is suitable for displaying and storing any information about the bicycle trip (such as temperature, duration, heart rate, bicycle speed and driving path characteristics) and, through the PC interface 27 or said local radioreceiver 26 the device will also transmit the above information to other devices for comparing, storing and monitoring the user sports performance.

In general, any information sensed by said sensors will require an electrical matching, as indicated in the block diagram of FIG. 1, by sensor interfaces 17, to be controlled by said microprocessor 12.

Then, said information can be further processed by suitable processing algorithms 15 designed for performing filtering, averaging, scaling or other handling operations, to achieve the end data to be displayed on the display 4.

In particular, the information related to the road inclination or slope is derived, in the preferred embodiment herein disclosed, from a gravity force responsive accelerometer, representing the main reference for identifying said road inclination, even if a simple instantaneous measurement would not be sufficient to provide the searched datum which, in general, is corrupted by spurious acceleration phenomena generated because of the bicycle and cyclist motion.

Figure 2:
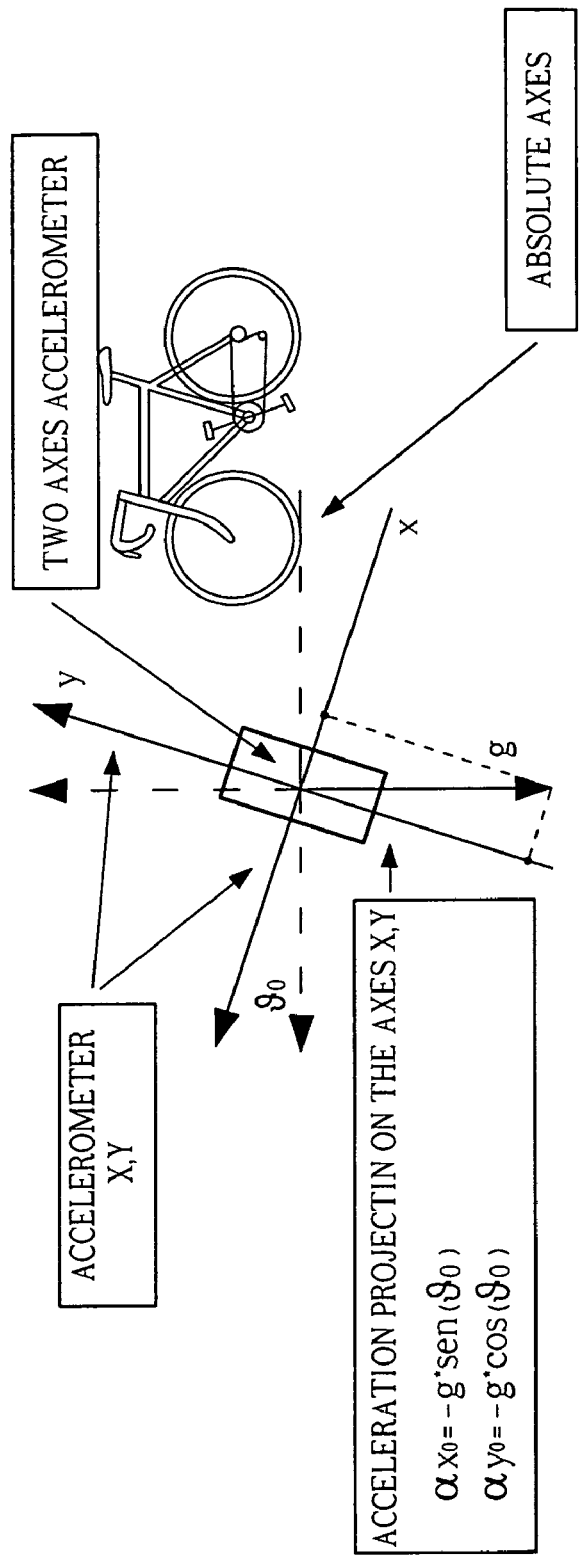
FIG. 2 is a schematic view showing a top plan view of a bicycle and including an accelerometer integral with a fixed part of the bicycle framework.
Figure 3:
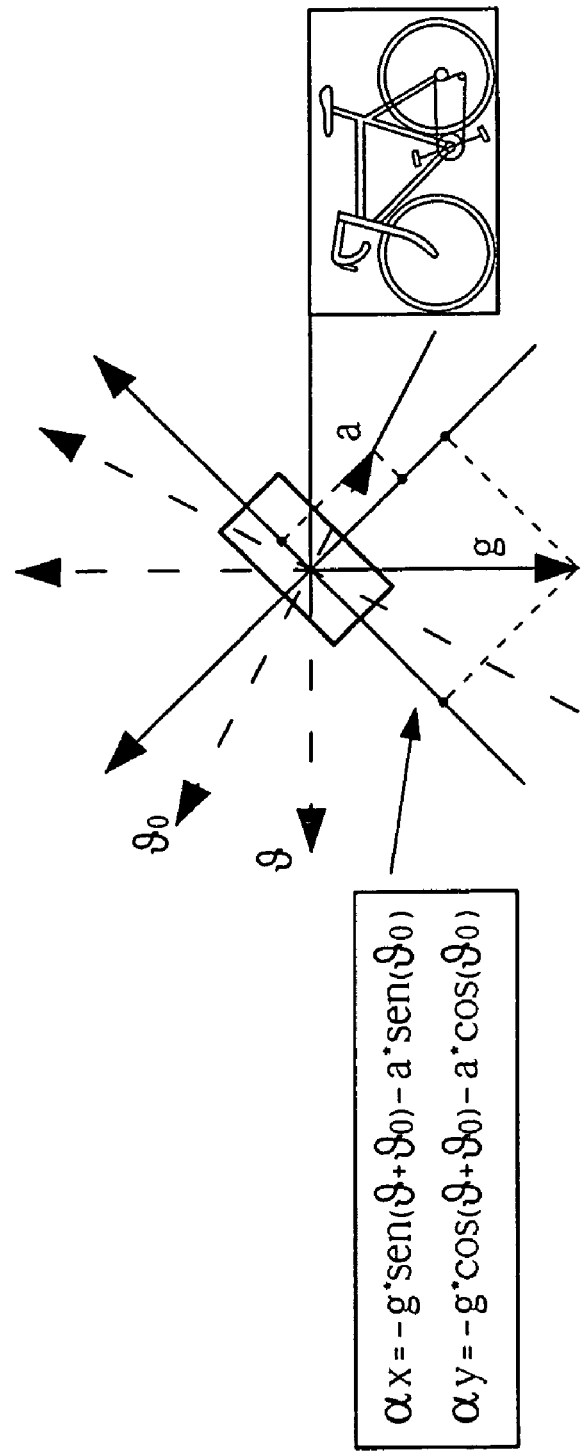
FIG. 3 is a further schematic view, similar to FIG. 2, but showing a modified use condition due to an inclination or slope of the road and, consequently, of the bicycle framework, through an angle θ, and due to an acceleration a transmitted by the cyclist in the bicycle direction of movement.

Thus, it is necessary to apply a specifically designed algorithm, which will be disclosed in a more detailed manner hereinafter, with reference to FIGS. 2 and 3, showing two operating directions of the bicycle framework, together with a corresponding direction of a two-axis accelerometer, FIG. 2 showing by a top plan view of the bicycle and of the corresponding accelerometer supposed integral with a fixed part of the bicycle framework or handlebar, and, in particular, in the preferred embodiment herein disclosed, being mounted in said supporting arm 7 of the subject smart rear-view mirror, adapted to be clamped on the bicycle handlebar, said accelerometer being directed, with respect to the bicycle framework, according to an angle $\theta o$ which cannot be modified after having installed the subject smart rear-view mirror, without limiting the use of the device, and requiring a single calibrating operation to be performed immediately after the assembling.

Thus, after having performed the above calibrating operation, all the inclinations of the bicycle axis will be calculated respectively based on said angle $\theta o$ assumed as a reference.

The formulas shown in FIGS. 2 and 3 show the reference inclination or slope based on the values measured by the acceleration sensor, which values measured in a rest condition, will correspond to the gravity acceleration g projected in the direction of the axes X and Y of the sensor according to the angle $\theta o$.

FIG. 3 shows as this condition is modified because of an inclination of the road (and accordingly of the bicycle framework) according to an angle $\theta$, and an acceleration a applied by the cyclist in the bicycle driving direction, said acceleration having a component in the direction of the axis Y of the sensor because of the calibrating angle $\theta o$, thereby introducing an error which must be compensated for by the illustrated formula so as to perform an accurate measurement of said road inclination, independently from other error sources, for example vibrations caused by an unevenness of the road surface and uneven movements of the cyclist in pedaling or modifying his position on the bicycle saddle.

Thus, said algorithm will apply to approximately derived data, filtering and averaging operations, to provide a "clean" datum.

The optional provision of a GPS receiver in the subject smart rear-view mirror will provide the cyclist with many useful performance functions in his/her trip such as the above mentioned self-orienting or compass function.

On the display of the preferred embodiment, in particular, the cyclist movement or driving direction will be indicated in an alphanumeric form (for example N, O, S, E showing cardinal points, NNE showing North, North East and so on).

Moreover, in a further improved embodiment including a more sophisticated display, it would be possible to also provide a graphic pattern displaying, and, depending on the display size and resolution, to also display, through a suitable connection to a computer, through a USB interface, geographic maps in a graphic form (for example in a Jpeg form), useful, for example, in off-road trips.

Moreover, an auxiliary on-board memory would allow to store any desired covered path, to further follow it at will.

The thus obtained information could also be transferred to a personal computer and reused by other persons or stored as a history of the cyclist sports activity.

It has been found that the invention fully achieves the intended aim and objects.

In fact, the invention has provided a rear-view mirror which, by integrating therein suitable functional components, such as the disclosed electronic display, can be considered a multifunctional device, for storing and delivering driving information, and this negatively affecting the usual mode of operation of the user or hindering/distracting the user.

In this connection it should be apparent that the displayed information will depend on the selected transport means and sensors to be used.

In particular, the built-in display smart rear-view mirror according to the present invention may be preferably applied to a bicycle handlebar for improving the operation of said bicycle from safety and drive comfort standpoints.

However, the above application to a bicycle should not be considered as limitative, since the inventive concept can be easily extended to other transport means, such as cars, motor-cycles and so on.

In practicing the invention, the used materials, as well as the contingent size and shapes, can be any, depending on requirements.

The invention claimed is:

1. A multifunctional device for a bicycle, comprising:
   a protective housing for protecting said device against water and dust penetration;
   mounting means for mounting said device on a bicycle;
   a rear-view mirror housed in said housing;
   an information and data display built-in in said rear-view mirror;
   measuring sensors for measuring kinetic and environmental parameters operatively connected to said information and data display;
   electronic components for measuring time and controlling an independent power supply device;
   wherein said rear-view mirror has a first reflecting surface which is physically separated from a second transparent surface of said rear-view mirror, said first and second surfaces being arranged in non adjoining areas of the device;
   wherein said mounting means comprise a supporting arm coupled to said protective housing through an articulated coupling assembly to properly orient the mirror according to the user's requirements;
   wherein said measuring sensors are housed in a part of said device integral with the vehicle on which said device is applied, said part integral with the vehicle being said supporting arm to allow the mirror sensors to be mounted at a fixed position with respect to the bicycle frame and regardless of the position of the mirror relative to the supporting arm.

2. A device according to claim 1, wherein said rear-view mirror operates based on image reflection operating mode in which images are reflected from said first reflection surface or from a further image forming surface included in a display, a video camera, an optical fibres.

3. A device, according to claim 1, wherein said display is an independent back-illuminated display, a point matrix display, a colour display, a gray tone or monochromatic display, based on a LCD, LED, plasma technology.

4. A device, according to claim 1, wherein said protective housing comprises a shell member made of single plastics material, a mixed plastics material, or a metal material which, as broken by an impact, does not release broken parts.

5. A device, according to claim 1, wherein said device is mounted on a fixed part of said bicycle therefrom said device may be removed without using removing implements such as a screw driver, or a gripper.

6. A device, according to claim 4, wherein said device comprises connector means for connecting said sensors, said connector means either comprising sliding contacts or using a contactless technology selected from transponder means, a capacitive or magnetic or optic coupling means adapted to transmit information and power within a short range.

7. A device, according to claim 4, wherein said device comprises a plurality of operating push-buttons arranged on a part of said device different from a front face of said device, that is on said shell member, said supporting arm or on a fixed part of said device.

8. A device, according to claim 1, wherein said sensors means comprise a slope measuring acceleration sensor.

9. A device, according to claim 1, wherein said sensors means comprise a vehicle speed and position sensor.

10. A device, according to claim 1, wherein said device comprises a GPS system for indicating to a user a direction of a motion of said user with respect to cardinal points and a position of said user with respect to a geographical map built-in in said device in a JPEG graphic form.

11. A device, according to claim 1, wherein said device comprises independent rechargeable battery power supply means.

* * * * *